(12) United States Patent
Majumdar et al.

(10) Patent No.: US 8,454,778 B2
(45) Date of Patent: Jun. 4, 2013

(54) PNEUMATIC TIRE WITH BARRIER LAYER AND METHOD OF MAKING THE SAME

(76) Inventors: Ramendra Nath Majumdar, Hudson, OH (US); Kiyoshi Ueyoko, Copley, OH (US)

( * ) Notice: Subject to any disclaimer, the term of this patent is extended or adjusted under 35 U.S.C. 154(b) by 390 days.

(21) Appl. No.: 12/946,484

(22) Filed: Nov. 15, 2010

(65) Prior Publication Data

US 2012/0118465 A1    May 17, 2012

(51) Int. Cl.
*B60C 5/14* (2006.01)
*B60C 9/02* (2006.01)

(52) U.S. Cl.
USPC .... 156/134; 152/510; 152/548; 152/DIG. 16; 156/304.1

(58) Field of Classification Search
CPC ........... B60C 5/14; B29D 2030/421; B29D 2030/422; B29D 2030/423
USPC .......... 152/510, 548, DIG. 16; 156/134, 156/304.1; 428/57
See application file for complete search history.

(56) References Cited

U.S. PATENT DOCUMENTS

| | | | |
|---|---|---|---|
| 2,754,887 A * | 7/1956 | Wykoff | ............ 156/134 |
| 4,121,642 A | 10/1978 | Schwartz | |
| 4,214,619 A | 7/1980 | Bowerman, Jr. et al. | |
| 4,263,075 A | 4/1981 | Bowerman, Jr. et al. | |
| 4,277,295 A | 7/1981 | Schmidt et al. | |
| 4,284,742 A | 8/1981 | Bowerman, Jr. et al. | |
| 4,396,051 A | 8/1983 | Ogawa et al. | |
| 4,424,847 A | 1/1984 | Kitazawa et al. | |
| 4,725,649 A | 2/1988 | Hoshino | |
| 4,811,773 A | 3/1989 | Endo et al. | |
| 4,874,670 A | 10/1989 | Boon et al. | |
| 4,913,209 A | 4/1990 | Hong et al. | |
| 4,928,741 A | 5/1990 | Rye et al. | |
| 4,962,803 A | 10/1990 | Welter | |
| 4,966,214 A | 10/1990 | Kadota | |
| 5,036,113 A | 7/1991 | Boon et al. | |
| 5,085,942 A | 2/1992 | Hong et al. | |

(Continued)

FOREIGN PATENT DOCUMENTS

| | | |
|---|---|---|
| EP | 0633152 A1 | 1/1995 |
| EP | 0706878 A2 | 4/1996 |

(Continued)

OTHER PUBLICATIONS

English machine translation of JP05-221204, dated Aug. 1993.*

(Continued)

*Primary Examiner* — Richard Crispino
*Assistant Examiner* — Robert Dye
(74) *Attorney, Agent, or Firm* — Wood, Herron & Evans, LLP

(57) ABSTRACT

A pneumatic tire and a method of making a tire are provided. The tire includes a tire tread, a tire layer, and a barrier layer. The tire layer is circumferentially disposed inwardly of the tire tread and includes a first end and a second end situated adjacent each other to define a butt joint. The barrier layer includes a first end and a second end, a portion of the first end of the barrier layer overlaps the second end by about 1.5 cm or more to define a lap joint, and where the first end of the barrier layer is received between and extends beyond the butt joint such that the first end of the tire layer is sandwiched between the lap joint.

20 Claims, 2 Drawing Sheets

U.S. PATENT DOCUMENTS

| | | | |
|---|---|---|---|
| 5,158,627 | A | 10/1992 | Saneto et al. |
| 5,265,660 | A | 11/1993 | Rye et al. |
| 5,295,526 | A | 3/1994 | Tokieda et al. |
| 5,379,819 | A | 1/1995 | Adachi |
| 5,385,980 | A | 1/1995 | Schaefer et al. |
| 5,392,830 | A | 2/1995 | Janello et al. |
| 5,443,104 | A | 8/1995 | Dollinger et al. |
| 5,665,183 | A | 9/1997 | Kresge et al. |
| 5,738,158 | A | 4/1998 | Ozawa et al. |
| 5,851,323 | A | 12/1998 | Kaido et al. |
| 5,938,869 | A * | 8/1999 | Kaido et al. ............. 152/510 |
| 5,992,486 | A | 11/1999 | Katsuki et al. |
| 5,992,487 | A | 11/1999 | Adachi |
| 6,024,816 | A | 2/2000 | Yamakawa et al. |
| 6,062,283 | A | 5/2000 | Watanabe et al. |
| 6,073,669 | A | 6/2000 | Takada et al. |
| 6,079,465 | A | 6/2000 | Takeyama et al. |
| 6,079,466 | A | 6/2000 | Watanabe et al. |
| 6,116,311 | A | 9/2000 | Ueyoko et al. |
| 6,136,123 | A | 10/2000 | Kaido et al. |
| 6,179,941 | B1 | 1/2001 | Yamakawa et al. |
| 6,244,317 | B1 | 6/2001 | Yamakawa et al. |
| 6,334,919 | B1 | 1/2002 | Takeyama et al. |
| 6,402,867 | B1 | 6/2002 | Kaido et al. |
| 6,427,743 | B1 | 8/2002 | Ueyoko et al. |
| 6,538,066 | B2 | 3/2003 | Watanabe et al. |
| 6,609,550 | B2 | 8/2003 | Suzuki |
| 6,617,383 | B2 | 9/2003 | Ikawa et al. |
| 6,719,026 | B2 | 4/2004 | Suzuki |
| 6,788,192 | B2 | 9/2004 | Shimura |
| 6,827,115 | B1 | 12/2004 | Van Hoose |
| 6,843,292 | B2 | 1/2005 | Wang |
| 6,861,470 | B2 | 3/2005 | Watanabe et al. |
| 6,877,538 | B2 | 4/2005 | Scheuren |
| 6,907,911 | B2 | 6/2005 | Wang |
| 6,908,958 | B2 | 6/2005 | Maruyama et al. |
| 6,913,052 | B2 | 7/2005 | Losey |
| 6,962,183 | B2 | 11/2005 | Ueyoko et al. |
| 6,964,719 | B1 | 11/2005 | Van Hoose |
| 7,019,063 | B2 | 3/2006 | Wada et al. |
| 7,040,366 | B2 | 5/2006 | Minami et al. |
| 7,060,146 | B2 | 6/2006 | Ikeda et al. |
| 7,117,911 | B2 | 10/2006 | Kanenari et al. |
| 7,128,114 | B2 | 10/2006 | Suzuki |
| 7,163,736 | B2 | 1/2007 | Takahashi |
| 7,172,002 | B2 | 2/2007 | Ueyoko et al. |
| 7,275,574 | B2 | 10/2007 | Watanabe et al. |
| 7,284,582 | B2 | 10/2007 | Zanzig et al. |
| 7,332,047 | B2 | 2/2008 | Majumdar et al. |
| 7,404,424 | B2 | 7/2008 | Higuchi et al. |
| 7,409,974 | B2 | 8/2008 | Colantonio et al. |
| 7,419,557 | B2 | 9/2008 | Majumdar et al. |
| 7,459,212 | B2 | 12/2008 | Yamakawa et al. |
| 7,604,031 | B2 | 10/2009 | Zanzig et al. |
| 7,704,343 | B2 | 4/2010 | Kanenari |
| 7,712,499 | B2 | 5/2010 | Yano et al. |
| 7,798,188 | B2 | 9/2010 | Sakai et al. |
| 2002/0056495 | A1 | 5/2002 | Hiruma |
| 2004/0084120 | A1 | 5/2004 | Arnold et al. |
| 2004/0140042 | A1 | 7/2004 | Teratani et al. |
| 2004/0226643 | A1 | 11/2004 | Yagi et al. |
| 2005/0148718 | A1 | 7/2005 | Ishida et al. |
| 2005/0173041 | A1 | 8/2005 | Miki |
| 2005/0211360 | A1 | 9/2005 | Ishida |
| 2006/0042740 | A1 | 3/2006 | Takahashi et al. |
| 2006/0060284 | A1 | 3/2006 | Zanzig et al. |
| 2006/0118227 | A1 | 6/2006 | Miki |
| 2006/0254695 | A1 | 11/2006 | Higuchi et al. |
| 2007/0209744 | A1 | 9/2007 | Matsumura |
| 2007/0221287 | A1 | 9/2007 | Izumoto |
| 2008/0047646 | A1 | 2/2008 | Hong et al. |
| 2008/0078490 | A1 | 4/2008 | Hashimoto |
| 2008/0105352 | A1 | 5/2008 | Ueyoko et al. |
| 2008/0142141 | A1 | 6/2008 | Takahashi |
| 2008/0314490 | A1 | 12/2008 | Morooka |
| 2008/0314491 | A1 | 12/2008 | Soeda et al. |
| 2008/0314492 | A1 | 12/2008 | Tsou et al. |
| 2008/0314493 | A1 | 12/2008 | Hara |
| 2009/0038727 | A1 | 2/2009 | Hong |
| 2009/0038728 | A1 | 2/2009 | Kanenari |
| 2009/0038729 | A1 | 2/2009 | Soeda et al. |
| 2009/0065118 | A1 | 3/2009 | Morooka |
| 2009/0084482 | A1 | 4/2009 | Majumdar et al. |
| 2009/0084483 | A1 | 4/2009 | Majumdar et al. |
| 2009/0114328 | A1 | 5/2009 | Takahashi et al. |
| 2009/0126847 | A1 | 5/2009 | Kobayashi |
| 2009/0139623 | A1 | 6/2009 | Kaiser |
| 2009/0151841 | A1 | 6/2009 | Jones et al. |
| 2009/0151846 | A1 | 6/2009 | Zhao et al. |
| 2009/0165914 | A1 | 7/2009 | Tomoi |
| 2009/0173431 | A1* | 7/2009 | Hashimura et al. ........... 156/123 |
| 2009/0205766 | A1 | 8/2009 | Matsuda |
| 2009/0205770 | A1 | 8/2009 | Matsuda |
| 2009/0211683 | A1 | 8/2009 | Takahashi |
| 2009/0242094 | A1 | 10/2009 | Kato et al. |
| 2009/0283195 | A1 | 11/2009 | Reese et al. |
| 2009/0288750 | A1 | 11/2009 | Majumdar et al. |
| 2009/0308523 | A1 | 12/2009 | Kuramori |
| 2009/0311548 | A1 | 12/2009 | Kirino |
| 2009/0314403 | A1 | 12/2009 | Tanno |
| 2009/0320983 | A1 | 12/2009 | Sawada et al. |
| 2010/0018622 | A1 | 1/2010 | Tanno et al. |
| 2010/0024938 | A1 | 2/2010 | Ishiyama |
| 2010/0024941 | A1 | 2/2010 | Hara et al. |
| 2010/0036028 | A1 | 2/2010 | Morooka |
| 2010/0043937 | A1 | 2/2010 | Matsunaga et al. |
| 2010/0071823 | A1 | 3/2010 | Tomoi |
| 2010/0089514 | A1 | 4/2010 | Fukushima |
| 2010/0099821 | A1 | 4/2010 | Soeda et al. |
| 2010/0108221 | A1 | 5/2010 | Shibata et al. |
| 2010/0108229 | A1 | 5/2010 | Hata |
| 2010/0130663 | A1 | 5/2010 | Taguchi et al. |
| 2010/0147431 | A1 | 6/2010 | Morooka |
| 2010/0147432 | A1 | 6/2010 | Morooka |
| 2010/0147440 | A1 | 6/2010 | Matsunaga |
| 2010/0154960 | A1 | 6/2010 | Kishizoe |
| 2010/0175802 | A1 | 7/2010 | Morooka |
| 2010/0181003 | A1 | 7/2010 | Inoue |
| 2010/0186866 | A1 | 7/2010 | Tomoi |
| 2010/0193098 | A1 | 8/2010 | Kirino |
| 2010/0212801 | A1 | 8/2010 | Matsunaga |

FOREIGN PATENT DOCUMENTS

| | | | |
|---|---|---|---|
| EP | 2000292 A1 | | 12/2008 |
| JP | 05-221204 | * | 8/1993 |
| JP | 7070372 A | | 3/1995 |
| JP | 10-016082 | * | 1/1998 |
| JP | 2007009121 A | | 1/2007 |
| JP | 2007320992 A | | 12/2007 |
| JP | 2009220460 A | | 10/2009 |
| JP | 2010013543 A | | 1/2010 |
| JP | 2010013617 A | | 1/2010 |
| WO | 9856598 A1 | | 12/1998 |
| WO | 0236367 A1 | | 5/2002 |
| WO | 2004050391 A1 | | 6/2004 |
| WO | 2006001660 A1 | | 1/2006 |
| WO | 2006001680 A1 | | 1/2006 |
| WO | 2008029779 A1 | | 3/2008 |

OTHER PUBLICATIONS

European Search Report issued in Application No. 11188354.2, dated Sep. 5, 2012, 6 pages.

* cited by examiner

PNEUMATIC TIRE WITH BARRIER LAYER AND METHOD OF MAKING THE SAME

TECHNICAL FIELD

The present invention is generally directed to pneumatic tires and, more specifically, to pneumatic tires with barrier layers and methods of making the same.

BACKGROUND

Conventionally, barrier layers for use in pneumatic tires are made out of butyl or halogenated butyl rubber to inhibit the loss of air or oxygen therethrough, such as to maintain pressure over extended periods of time. Often times, however, to use these butyl rubber-based materials, an additional rubber layer, e.g., a tie layer, with low hysteresis loss is sandwiched between the barrier layer, e.g., an innerliner, and the carcass or plies of the tire. This additional tie layer undesirably increases the weight of the innerliner system. To that end, new low gas permeability materials for use in barrier layers have recently been developed that can replace conventional butyl rubber-based materials. One example of the newer materials, which has been developed for use as tire barrier layers, includes undrawn polymeric films. Another example includes dynamically-vulcanized alloys (DVAs), which can include mixtures of thermoplastic resins, elastomers and, optionally, a binder resin to enhance the compatibility between the two. Advantageously, these newer, low gas permeable materials are markedly thinner than their conventional butyl rubber-based counterparts, which provide a substantial weight savings. However, there are still drawbacks to overcome with the new materials.

For example, these new materials often demonstrate poor tack, poor adhesion to self after curing, and poor adhesion to other conventional tire layer materials used in building tires, such as ply rubber. These challenges are often addressed by the appropriate selection of adhesives, which can be applied to the surface(s) of the barrier layer. However, this adds extra material and processing steps, and thus, extra costs to the manufacturing process. In addition, for non-cylindrical panels of barrier layers, the ends, which must be secured together, are oftentimes the source of failure, as is described in Kaido et al., U.S. Pat. No. 5,938,869. For example, for simple overlap junctions, a lap joint may separate upon tire inflation and also can introduce substantial amounts of non-uniformity at the overlap joints.

Accordingly, there remains a need for a pneumatic tire with a barrier layer, and a method of making the same, that overcomes the aforementioned drawbacks and disadvantages.

SUMMARY

In one embodiment, a tire is provided that includes a tire tread, a tire layer, and a barrier layer. The tire layer is circumferentially disposed inwardly of the tire tread and includes a first end and a second end situated adjacent each other to define a butt joint. The barrier layer is circumferentially disposed inwardly of the tire tread and situated adjacent the tire layer, and includes a first end and a second end. A portion of the first end of the barrier layer overlaps the second end by about 1.5 cm or more to define a lap joint, and wherein the first end of the barrier layer is received between and extends beyond the butt joint so that the first end of the tire layer is sandwiched between the lap joint.

In another embodiment, a tire is provided that includes a tire tread, a tire layer, and a barrier layer. The tire layer is circumferentially disposed inwardly of the tire tread and includes a first end and a second end situated adjacent each other to define a butt joint. The barrier layer is circumferentially disposed inwardly of the tire layer and is situated adjacent the tire layer. The barrier layer includes an undrawn polymeric film that is coated on at least one surface with an adhesive material. The undrawn polymeric film includes 60 to 90 weight percent of a thermoplastic resin and 10 to 40 weight percent of an elastomer, and has a film thickness from about 25 microns to about 200 microns. The barrier layer further includes a first end and a second end. A portion of the first end of the barrier layer overlaps the second end by about 1.5 cm or more to define a lap joint, and wherein the first end of the barrier layer is received between and extends beyond the butt joint so that the first end of the tire layer is sandwiched between the lap joint.

In yet another embodiment, a method of making a tire is provided that includes building a green tire assembly, wherein the assembly includes a tire tread, a tire layer, and a barrier layer. The tire layer is circumferentially disposed inwardly of the tire tread and includes a first end and a second end situated adjacent each other to define a butt joint. The barrier layer is circumferentially disposed inwardly of the tire tread and situated adjacent the tire layer. The barrier layer further includes a first end and a second end. A portion of the first end of the barrier layer overlaps the second end by about 1.5 cm or more to define a lap joint, and wherein the first end of the barrier layer is received between and extends beyond the butt joint so that the first end of the tire layer is sandwiched between the lap joint.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF SPECIFIC EMBODIMENTS

Figure 1:
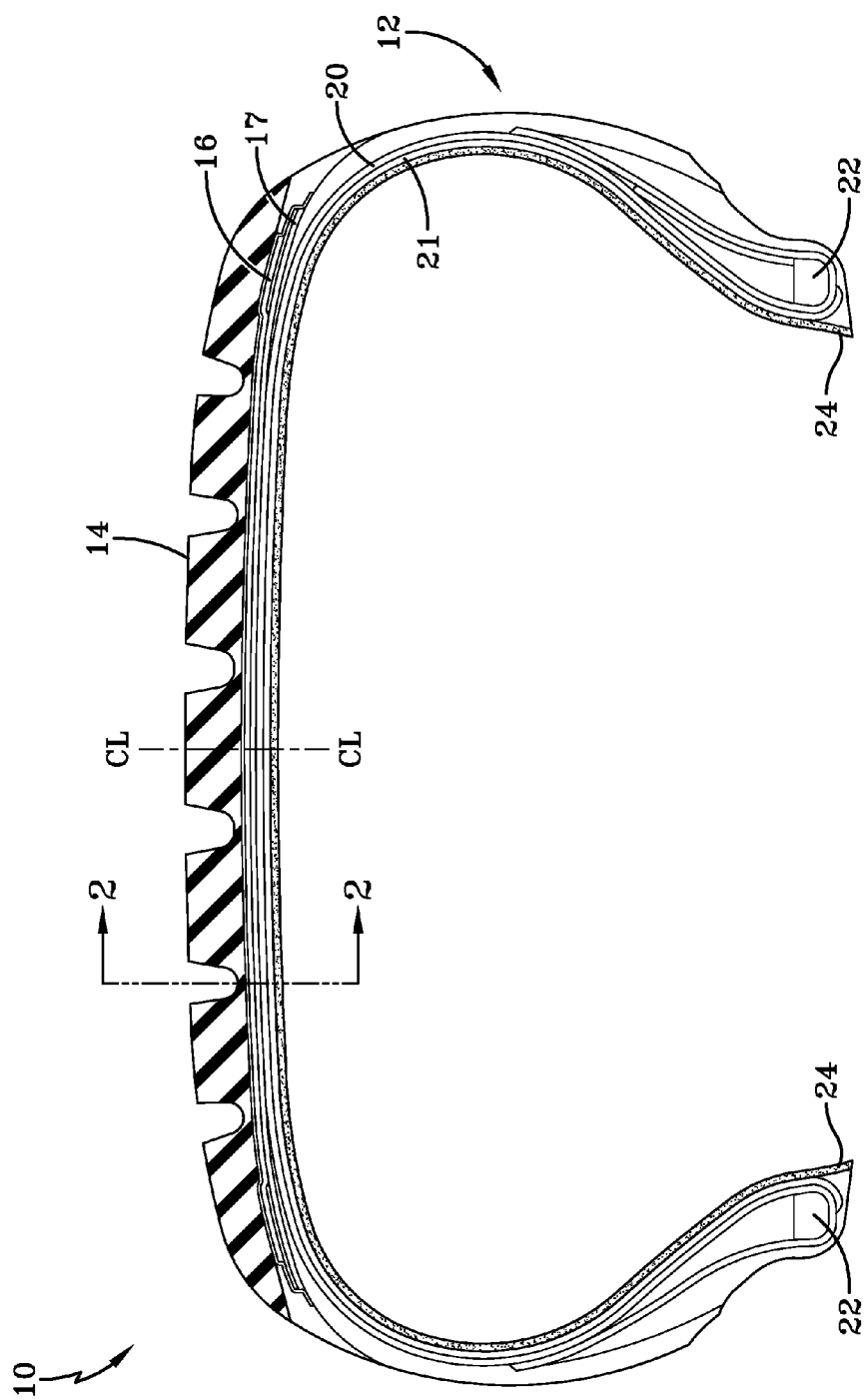
FIG. 1 is a cross-sectional view of a pneumatic tire in accordance with an embodiment of the present invention.
Figure 2:
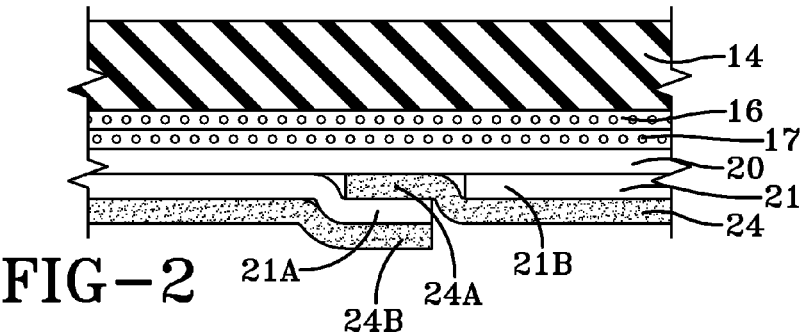
FIG. 2 is an enlarged partial cross-sectional view of the pneumatic tire of FIG. 1 taken along line 2-2.

FIGS. 1 and 2 show a pneumatic tire 10 in accordance with an embodiment of the invention, that includes sidewalls 12, a rubber tread 14, belts 16 and 17, a supporting carcass, which includes ply layers 20 and 21 and inextensible beads 22, and an innermost barrier layer 24. The individual sidewalls 12 extend radially inward from the axial outer edges of the tread 14 to join the respective inextensible beads 22. The supporting carcass, which includes ply layers 20, 21, act as a supporting structure for the belts 16, 17, the tread 14, and the sidewalls 12. The rubber tread 14 is adapted to be ground contacting when the tire 10 is in use. And the barrier layer 24 is designed to inhibit the passage of air or oxygen therethrough so as to maintain tire pressure over extended periods of time.

As best shown in FIG. 2, the barrier layer 24 has a first end 24A and a second end 24B configured as a lap joint, when formed in a cylindrical configuration. As used herein, a "lap joint" is formed where at least a portion of the ends, e.g., first and second ends 24A, 24B, of a tire layer, e.g., barrier layer 24, do not align on the same general plane, but instead overlap by at least some distance, for example, by about 1.5 cm or more. In the one example, the overlap can be from about 1.5 cm to about 5 cm. In the absence of any intervening layer of material, the lap joint produces a union having a thickness approximately equal to at least a sum thickness of the first and second ends, 24A, 24B. And ply layer 21 has a first end 21A and a second end 21B configured as a butt joint. As used herein, a "butt joint" is formed where a first end, e.g. first end 21A, approaches a second end, e.g., second end 21B, but does not extend beyond the second end 21B. Some desired amount of a circumferential gap generally exists between the first and second ends 21A, 21B. As shown in FIG. 2, the first and second ends 21A, 21B may be on a similar general plane nearing a point of union. Further, as shown in FIG. 3 and as discussed further below, the first and/or the second ends, 21A, 21B may have an angled edge, i.e., a non-squared edge.

With continuing reference to FIGS. 1 and 2, the barrier layer 24 is the innermost layer of the tire 10, which is oftentimes referred to as an innerliner. The barrier layer 24 is circumferentially disposed inwardly of ply layer 21, and the first end 24A is received between and extends beyond the butt joint so that the first end 21A of the ply layer 21 is sandwiched between the lap joint. Further, first end 24A of the barrier layer 24 generally is sandwiched between ply layers 20 and 21.

Figure 3:
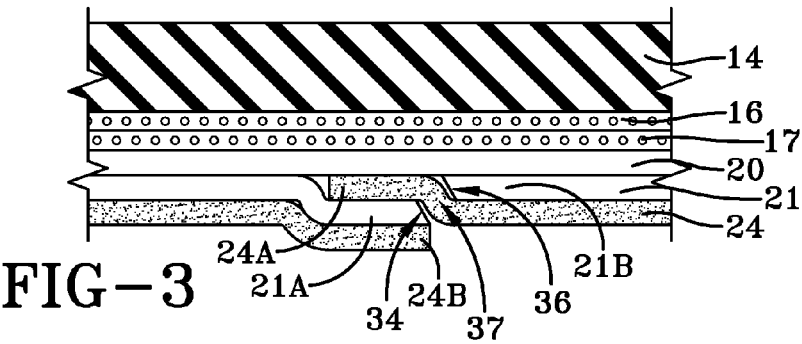
FIG. 3 is an enlarged cross-sectional view of another embodiment of a butt joint and a lap joint configuration for use with the pneumatic tire of FIG. 1.

In an alternative embodiment, as shown in FIG. 3, the relative configuration of ply layer 21 and the barrier layer 24 is the same as shown in FIG. 2, however, first end 21A and second end 21B have angled edges 34 and 36, respectively. The edges 34, 36 are angled generally parallel to a traverse angle of a section 37 of the first end 24A of barrier layer 24 across the butt joint, which is defined by the first and second ends 21A, 21B of the ply layer 21.

Figure 4:
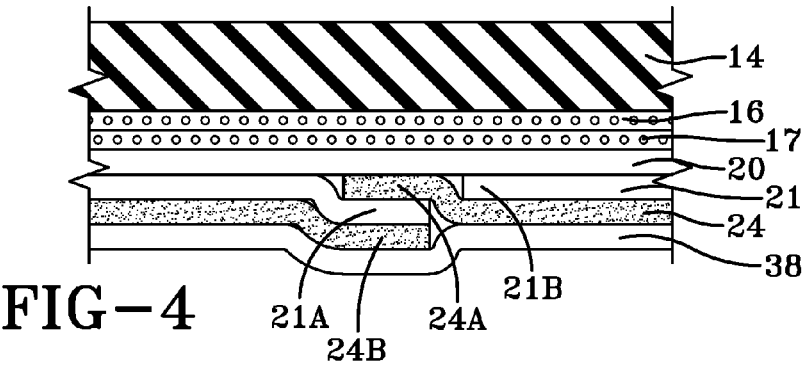
FIG. 4 is an enlarged cross-sectional view of another embodiment of a butt joint and a lap joint configuration for use with the pneumatic tire of FIG. 1.

With reference now to FIG. 4, the tire 10 may further optionally include another tire layer 38 applied adjacent to and radially-inward of the barrier layer 24. Accordingly, the barrier layer 24 generally is sandwiched between ply layer 21 and tire layer 38, with first end 24A being sandwiched between ply layers 20 and 21. In this embodiment, the tire layer 38 may be another ply layer or a butyl rubber-based barrier layer, for example. Here, the barrier layer 24 is no longer the innermost layer.

Figure 5:
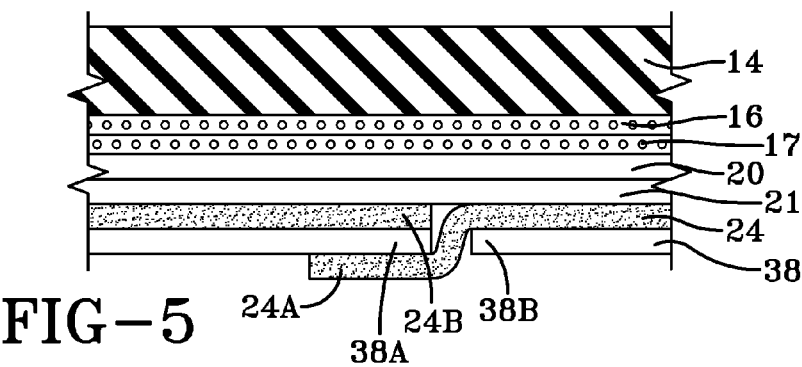
FIG. 5 is an enlarged cross-sectional view of a butt joint and a lap joint configuration of a pneumatic tire in accordance with yet another embodiment of the present invention.

In yet another embodiment and with reference to FIG. 5, barrier layer 24, which has first end 24A and second end 24B, is sandwiched between ply layer 21 and innermost tire layer 38. The innermost tire layer 38 includes a first end 38A and a second end 38B, which form a butt joint. The first end 24A of the barrier layer 24 is received between and extends beyond the butt joint so that the first end 38A of tire layer 38 is sandwiched between the lap joint, which is formed by a portion of first end 24A overlapping second end 24B of the barrier layer 24. According to one embodiment, the innermost tire layer 38 is a butyl rubber-based barrier layer. According to another embodiment, the innermost tire layer 38 is a ply layer. The configuration shown in FIG. 5 also is not limited to only ply layer 21 as the radially outward adjacent layer. For example, in yet another embodiment, the ply layer 21 may be substituted by a butyl rubber-based barrier layer, thereby sandwiching the barrier layer 24 between two butyl rubber-based barrier layers.

According to the various embodiments of the invention, the barrier layer 24 may be a polymeric film, e.g., an undrawn or partially-drawn polymeric film, formed from a polymer composition including a mixture of a thermoplastic resin and an elastomer. The barrier layer 24 provides an excellent air permeability property and yet remains flexible.

The thermoplastic resin as used herein may include one or more polyamide resins, e.g., nylon 6, nylon 66, nylon 46, nylon 11, nylon 12, nylon 610, nylon 612, nylon 6/66 copolymer, nylon 6/66/610 copolymer, nylon MXD, nylon 6T, nylon 6/6T copolymer, nylon 66/PP copolymer, or nylon 66/PPS copolymer; N-alkoxyalkylated polyamide resins, e.g., methoxymethylated nylon 6, methoxymethylated nylon 6-610, or methoxymethylated nylon 612; polyester resins, e.g., polybutyleneterephthalate (PBT), polyethyleneterephthalate (PET), polyethyleneisophthalate (PEI), PET/PEI copolymer, polyacrylate, polybutylenenaphthalate, liquid crystal polyester, or other aromatic polyesters; polynitrile resins, e.g., polyacrylonitrile (PAN), polymethacrylonitrile, acrylonitrile/styrene copolymer (AS), methacrylonitrile/styrene copolymer, or methacrylonitrile/styrene/butadiene copolymer; polymethacrylate resins, e.g., polymethylmethacrylate (PMMA), or polyethylmethacrylate; polyvinyl resins, e.g., vinyl acetate, polyvinyl alcohol (PVA), vinyl alcohol/ethylene copolymer (EVOH), polyvinylidenechloride (PVDC), polyvinylchloride (PVC), polyvinyl/polyvinylidenechloride copolymer, polyvinylidene chloride/methylacrylate copolymer, or polyvinylidenechloride/acrylonitrile copolymer; cellulose resins, e.g., cellulose acetate, or cellulose acetobutyrate; fluoride resins, e.g., polyvinylidenefluoride (PVDF), polyvinyl fluoride, polychlorofluoroethylene (PCTFE), or tetrafluoroethylene/ethylene copolymer; or amide resins, e.g., aromatic polyimide (PI).

The elastomer compatible with these thermoplastic resins may include, if not specifically limited to, diene rubbers and their hydrogenated products, e.g., natural rubber, isoprene rubber, epoxidized natural rubber, styrene-butadiene rubber, butadiene rubber (high cis-butadiene rubber, or low cis-butadiene rubber), natural rubber-butadiene rubber, hydrogenated natural rubber-butadiene rubber, or hydrogenated styrene-butadiene rubber, olefin rubbers, e.g., ethylene-propylene-diene monomer rubber (EPDM), maleic acid-modified ethylene-propylene rubber, isobutylene and isoprene copolymer (IIR), isobutylene and aromatic vinyl or diene monomer copolymer, acryl rubber, or ionomer; halogenated rubbers, e.g., brominated isobutylene and isoprene copolymer (Br-IIR), chlorinated isobutylene and isoprene copolymer (Cl-IIR), brominated isobutylene paramethylstyrene copolymer (Br-IPMS), polychloroprene (CR), chlorohydrine rubber (CHR), chlorosulfonated polyethylene (CSM), chlorinated polyethylene (CM), or maleic acid-modified chlorinated polyethylene (M-CM); silicon rubbers, e.g., methylvinylsilicon rubber, dimethylsilicon rubber, or methylphenylvinylsilicon rubber; sulfur-containing rubbers, e.g., polysulfide rubber; fluoride rubbers, e.g., vinylidene fluoride rubber, fluorine-containing vinylether rubber, tetrafluoroethylenepropylene rubber, fluorine-containing silicon rubber, or fluorine-containing phosphazene rubber; or thermoplastic elastomers, e.g., styrene elastomer, olefin elastomer, ester elastomer, urethane elastomer, or polyamide elastomer.

The relative percents of the thermoplastic resin and the elastomer in the polymeric composition can be determined according to the balance of film thickness, internal air permeation, and flexibility. According to one embodiment, the polymer composition includes 60 to 90 wt. % of the thermoplastic resin and 10 to 40 wt. % of the elastomer, based on the total weight of the polymer composition. When the content of the elastomer exceeds 40 wt. %, the polymeric film may possesses inadequate air permeability resistance. When the content of the elastomer is less than 10 wt. %, the polymeric film may not demonstrate a desired rubber-like elastomeric property, which can thereby present difficulty in the manufacture of tires and make the barrier layer 24 vulnerable to fracture while running.

According to yet another embodiment of the invention, in addition to the aforementioned components, a compatibility enhancer polymer may be used as a third component of the polymeric mixture, so as long as it does not diminish the desired properties of the polymeric film. Without being bound by any particular theory, the purpose of the compatibility enhancer polymer is to improve the compatibility between the thermoplastic resin and the elastomer. The compatibility enhancer polymer may assist in minimizing interfacial tension between the thermoplastic resin and the elastomer, which thereby may facilitate reducing a particle size of the elastomer particles forming a dispersed phase, which in turn facilitates the realization of the desired properties.

The compatibility enhancer polymer may include a copolymer having at least either one structure of the thermoplastic resin or the elastomer, or a copolymer structure having an epoxy group, a carbonyl group, a halogen group, an amine group, an oxazoline group, or a hydroxyl group that is reactive to the thermoplastic resin or the elastomer. The compatibility enhancer polymer may be selected depending on the types of the thermoplastic resin and the elastomer, and generally includes styrene/ethylene-butylene block copolymer (SEBS) and its maleic acid-modified product, EPDM, EPDM/styrene or EPDM/acrylonitrile graft copolymer and its maleic acid-modified product, styrene/maleate copolymer, reactive phenoxine, and the like. Additional examples of compatibility enhancer polymers may include polyethylene, polypropylene, polystyrene, acrylonitrile butadiene styrene (ABS), styrene butadiene styrene (SBS), SEBS, polycarbonate, etc. Further, the compatibility enhancer polymer may also be combined with other materials, such as other olefin copolymers or their maleic acid-modified or a glycidyl-containing derivatives. The weight percent of the compatibility enhancer polymer may be within the range from 0.5 to 10 parts by weight with respect to 100 parts by weight of the thermoplastic resin and the elastomer.

The polymer composition may further include conventional fillers, such as carbon, powdered quartz, calcium carbonate, alumina, titanium dioxide, and the like. The polymer composition may be free from a curing agent system.

The polymer composition thus obtained may be subjected to melt-extrusion and quenching to produce an undrawn or partially-drawn polymeric film, as described in U.S. Patent Application Publication Nos. 2008/0047646 and 2009/0038727, the contents of which are incorporated by reference herein in their entireties. The polymeric film may have a film thickness from about 25 microns to about 200 microns. In another example, the thickness can range from about 50 microns to about 150 microns.

The polymeric film according to embodiments of the present invention may also have an oxygen permeability of less than $15 \times 10^{-3}$ ccm/m$^2$·day·atm. As such, when used as the barrier layer 24 of the tire 10, the polymeric film should provide good air tightness and oxygen leakage preventive ability. The polymeric film according to embodiments of the present invention may also have a fracture elongation of more than 200% at room temperature. As such, when used as the barrier layer 24 of the tire 10, the polymeric film should not fracture during the tire shaping process.

Further, the polymeric film may be deformed under different conditions during the tire manufacturing and its subsequent use. Deformation under severe conditions, including under substantial temperature variations during the use of the tire, may negatively impact the performance of the barrier layer 24. Accordingly, the barrier layer 24, as an undrawn polymeric film, can have a yield point of more than 10% at $-35°$ C., so that the polymeric film can maintain its physical integrity and its low oxygen permeability, even after being subjected to tire deformation under normal weather conditions, and a deformation under severe cold conditions of $-35°$ C., as described in U.S. Patent Application Publication Nos. 2008/0047646 and 2009/0038727.

To facilitate bonding of the polymeric film to other tire layers, such as butyl rubber-based layers, e.g., ply layers 20, 21, an adhesive material coating may be used. Exemplary adhesives may include a rosin-based resin; a terpene-based resin; a petroleum resin; a cumarin-indene resin; a styrene-based resin; an alkylphenol resin; a polyester polyol/isocyanate-type resin; an acrylic acid ester copolymer/organic peroxide-type resin; a resorcinol-formaldehyde-latex (RFL) resin; a reinforced polyurethane adhesive (RPU) resin; or combinations thereof. The adhesive material may further include a reactive additive that is capable of reacting with the polymeric film and/or its adjacent tire layer. The reactive additive may include one or more reactive functional groups, including but not limited to, hydroxyl and isocyanate. The adhesive may be applied to one or both sides of the polymeric film. The adhesive may be applied in any conventional manner, such as spray coating, dip coating, or extrusion coating. The thickness of the adhesive material coating may be within the range from about 0.1 mil (about 2.5 microns) to about 10 mil (about 250 microns).

Where the barrier layer 24 is the innermost layer, a tread side surface of the barrier layer 24 may be affixed to the adjoining tire layer with the adhesive material coating. Further, the innermost surface of the barrier layer 24 may include the adhesive material coating so as to provide increased scratch resistance and/or to prepare the surface for affixing balance pads or similar materials, if desired. Where the barrier layer 24 is not the innermost layer, and instead is sandwiched between tire layers, the adhesive material coating may be provided on both surfaces, i.e., the tread side and the innermost side.

According to one embodiment, the adhesive material may be applied uniformly to the entirety of at least one surface of the barrier layer 24. Alternatively, only the bonding portions of the surface of the barrier layer 24 may have an adhesive material coating present.

The tire carcass, which includes one or more layers of plies 20, 21, may be any conventional rubber formulation suitable for use in pneumatic tires 10. In FIG. 1, the carcass is shown including two ply layers 20, 21, where ply layer 21 is situated adjacent barrier layer 24, having a rubber formulation that includes a diene rubber.

The diene rubber generally can include natural and/or synthetic rubber(s). In one example, the diene rubber is a high diene rubber and includes at least 50 mole % of a $C_4$ to $C_{12}$ diene monomer and, in another example, at least about 60 mole % to about 100 mole %. Useful diene monomer rubbers include homopolymers and copolymers of olefins or isoolefins and multiolefins, or homopolymers of multiolefins, which are well known and described in RUBBER TECHNOLOGY, 179-374 (Maurice Morton ed., Chapman & Hall 1995), and THE VANDERBILT RUBBER HANDBOOK 22-80 (Robert F. Ohm ed., R.T. Vanderbilt Co., Inc. 1990). Suitable examples of diene monomer rubbers include polyisoprene, polybutadiene rubber, styrene-butadiene rubber, natural rubber, chloroprene rubber, acrylonitrile-butadiene rubber, and the like, which may be used alone or in combination and mixtures. In another example, the diene rubber can include styrenic block copolymers, such as those having styrene contents of 5 wt. % to 95 wt. %. Suitable styrenic block copolymers (SBC's) include those that generally comprise a thermoplastic block portion A and an elastomeric block portion B.

The rubber formulation for ply layers 20, 21 can also include reinforcing filler(s), such as calcium carbonate, clay, mica, silica and silicates, talc, titanium dioxide, starch and other organic fillers such as wood flour, carbon black, and combinations thereof. In one example, the reinforcing filler is carbon black or modified carbon black. Additional additives known in the art may also be provided in the rubber formulation of the ply layers 20, 21 to provide a desired compound having desired physical properties. Such known and commonly used additive materials are activators, retarders and accelerators, rubber processing oils, resins including tackifying resins, plasticizers, fatty acids, zinc oxide, waxes, antidegradant, antiozonants, and peptizing agents.

The rubber formulation for the ply layers 20, 21 also includes curatives or a cure system so that the composition is vulcanizable and can be prepared by standard rubber compounding methods. As known to those having ordinary skill in the art, depending on the intended use of the ply layers 20, 21, the additives and curatives are selected and used in conventional amounts.

The remainder of the tire components, e.g., the belts 16 and 17, tire tread 14, sidewalls 12, and reinforcing beads 22, also generally may be selected from those conventionally known in the art. Similar to ply layers 20 and 21, the belts 16 and 17, tire tread 14, sidewalls 12, and beads 22 and their methods of preparation are well known to those having skill in such art. Using the layers described above, the pneumatic tire 10 can be built on a tire forming drum (not shown) using standard tire building techniques.

According to one embodiment of the present invention, the pneumatic tire 10, as shown in FIG. 1, may be prepared by first situating or positioning the innermost barrier layer 24 on the tire drum, with the remainder of the uncured tire being subsequently built thereon. Ply layer 21 is then positioned directly on the barrier layer 24 and configured with, for example, the butt joint shown in FIG. 2, and then followed by ply layer 20 and the rest of the tire carcass. Belts 16 and 17 are then positioned on the tire carcass. Finally, the rubber tire tread 14 is positioned on the belts 16, 17 thereby defining an uncured tire assembly.

After the uncured tire assembly has been built on the drum, it can be removed and placed in a heated mold. The mold contains an inflatable tire shaping bladder that is situated within the inner circumference of the uncured tire. After the mold is closed the bladder is inflated and it shapes the tire 10 by forcing it against the inner surfaces of the closed mold during the early stages of the curing process. The heat within the bladder and mold raises the temperature of the tire 10 to vulcanization temperatures.

Generally, the tire 10 can be cured over a wide temperature range—vulcanization temperatures can be from about 100° C. to about 250° C. For example, passenger tires might be cured at a temperature ranging from about 130° C. to about 170° C. and truck tires might be cured at a temperature ranging from about 150° C. to about 180° C. Cure time may vary from about one minute to several hours. Cure time and temperature depend on many variables well known in the art, including the composition of the tire components, including the cure systems in each of the layers, the overall tire size and thickness, etc. Vulcanization of the assembled tire results in complete or substantially complete vulcanization or cross-linking of the layers of the tire assembly, e.g., the barrier layer 24, belts 16, 17, the ply layers 20, 21, the tread 14 and sidewall layers 12. In addition to developing the desired strength characteristics of each layer and the overall structure, vulcanization enhances adhesion between these elements, resulting in a cured, unitary tire 10 from what were separate, multiple layers.

As discussed above, the barrier layer 24 is configured to transverse a butt joint of an adjoining tire layer. And the resulting overall structure allows for a tire construction having reduced weight, while yet retaining desirable low oxygen permeability.

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A tire comprising:
    a tire tread;
    a tire layer circumferentially disposed inwardly of the tire tread and including a first end and a second end situated adjacent each other to define a butt joint; and
    a barrier layer circumferentially disposed inwardly of the tire tread and situated adjacent the tire layer, the barrier layer including a first end and a second end, a portion of the first end of the barrier layer overlaps the second end by about 1.5 cm or more to define a lap joint, and wherein the first end of the barrier layer is received between and extends beyond the butt joint so that the first end of the tire layer is sandwiched between the lap joint.

2. The tire of claim 1, wherein the barrier layer comprises an undrawn polymeric film that is coated on at least one surface with an adhesive material, the undrawn polymeric film comprising at least one thermoplastic resin and at least one elastomer.

3. The tire of claim 2, wherein the at least one thermoplastic resin is selected from the group consisting of a polyamide resin, a polyester resin, a polynitrile resin, a polyvinyl resin, a cellulose resin, a fluororesin and an imide resin; or wherein the at least one elastomer is selected from the group consisting of diene rubbers and their hydrogenated products, halogenated rubbers, silicon rubbers, sulfur-containing rubbers, and thermoplastic elastomers.

4. The tire of claim 1, wherein at least one of the first or second ends of the tire layer has an angled edge.

5. The tire of claim 1, wherein the tire layer is a ply layer.

6. The tire of claim 1, wherein the barrier layer is an innermost layer of the tire.

7. The tire of claim 1, wherein the barrier layer is disposed between the tire tread and the tire layer.

8. The tire of claim 2, wherein the undrawn polymeric film has at least one of an oxygen permeation rate of less than $15 \times 10^{-3}$ ccm/m$^2$·day·atm, a fracture elongation of more than 200% at room temperature, or a yield point of more than 10% at $-35°$ C.

9. The tire of claim 2, wherein the adhesive material is selected from a rosin-based resin; a terpene-based resin; a petroleum resin; a cumarin-indene resin; a styrene-based resin; an alkylphenol resin; a polyester polyol/isocyanate-type resin; an acrylic acid ester copolymer/organic peroxide-type resin; or a resorcinol-formaldehyde-latex (RFL) resin.

10. The tire of claim 2, wherein the adhesive material further comprises a reactive additive capable of reacting with the undrawn polymeric film and/or the tire layer.

11. A tire comprising:
a tire tread;
a tire layer circumferentially disposed inwardly of the tire tread and including a first end and a second end situated adjacent each other to define a butt joint; and
a barrier layer circumferentially disposed inwardly of the tire tread and situated adjacent the tire layer, the barrier layer including an undrawn polymeric film that is coated on at least one surface with an adhesive material, the undrawn polymeric film comprising 60 to 90 weight percent of a thermoplastic resin and 10 to 40 weight percent of an elastomer, and having a film thickness from about 25 microns to about 200 microns,
wherein the barrier layer further includes a first end and a second end, a portion of the first end of the barrier layer overlaps the second end by about 1.5 cm or more to define a lap joint, and wherein the first end of the barrier layer is received between and extends beyond the butt joint so that the first end of the tire layer is sandwiched between the lap joint.

12. The tire of claim 11, wherein at least one of the first or second ends of the tire layer has an angled edge.

13. The tire of claim 11, wherein the tire layer is a ply layer.

14. The tire of claim 11, wherein the barrier layer is an innermost layer of the tire.

15. The tire of claim 11, wherein the barrier layer is disposed between the tire tread and the tire layer.

16. The tire of claim 11, wherein the undrawn polymeric film has at least one of an oxygen permeation rate of less than $15 \times 10^{-3}$ ccm/m$^2$·day·atm, a fracture elongation of more than 200% at room temperature, or a yield point of more than 10% at $-35°$ C.

17. The tire of claim 11, wherein the at least one thermoplastic resin is selected from the group consisting of a polyamide resin, a polyester resin, a polynitrile resin, a polyvinyl resin, a cellulose resin, a fluororesin and an imide resin; or wherein the at least one elastomer is selected from the group consisting of diene rubbers and their hydrogenated products, halogenated rubbers, silicon rubbers, sulfur-containing rubbers, and thermoplastic elastomers.

18. The tire of claim 11, wherein the adhesive material is selected from a rosin-based resin; a terpene-based resin; a petroleum resin; a cumarin-indene resin; a styrene-based resin; an alkylphenol resin; a polyester polyol/isocyanate-type resin; an acrylic acid ester copolymer/organic peroxide-type resin; or a resorcinol-formaldehyde-latex (RFL) resin.

19. The tire of claim 11, wherein the adhesive material further comprises a reactive additive capable of reacting with the undrawn polymeric film, the first ply and/or the second ply.

20. A method of making a tire comprising:
building a green tire assembly, wherein the assembly includes
a tire tread;
a tire layer circumferentially disposed inwardly of the tire tread and including a first end and a second end situated adjacent each other to define a butt joint; and
a barrier layer circumferentially disposed inwardly of the tire tread and situated adjacent the tire layer, barrier layer including a first end and a second end, the first end of the barrier layer overlaps the second end by about 1.5 cm or more to define a lap joint, and wherein the first end of the barrier layer is received between and extends beyond the butt joint so that the first end of the tire layer is sandwiched between the lap joint.

* * * * *